United States Patent [19]

Snitzer

[11] 4,106,857
[45] Aug. 15, 1978

[54] OPTICAL FILTERS
[75] Inventor: Elias Snitzer, Wellesley, Mass.
[73] Assignee: Better Environmental Development Corporation, Waltham, Mass.
[21] Appl. No.: 713,660
[22] Filed: Aug. 9, 1976

Related U.S. Application Data

[63] Continuation of Ser. No. 515,426, Oct. 16, 1974, abandoned.

[51] Int. Cl.² .............................................. G02B 5/22
[52] U.S. Cl. ..................................... 350/311; 252/300
[58] Field of Search ..................... 252/300; 350/311; 106/54

[56] References Cited

U.S. PATENT DOCUMENTS

| | | | |
|---|---|---|---|
| 2,805,166 | 9/1957 | Loffler | 106/54 |
| 3,022,181 | 2/1962 | Connelly | 350/1 |
| 3,052,153 | 9/1962 | Powell | 350/311 |
| 3,126,295 | 3/1964 | Young | 252/300 |

OTHER PUBLICATIONS

Savitskii, S. E., et al., "Use of Some Rare Earth Elements for Obtaining Light Filters with Preassigned Optical Characteristics" Chemical Abstracts, vol. 76 (1972) Abstract No. 75904a.
Starostina, G. P. et al., "Silica Light Filters, Doped with Eu, Yb and Sm", *Optical Technology*, vol. 41, No. 1, (Jan. 1974) pp. 39–42.

*Primary Examiner*—Leland A. Sebastian
*Assistant Examiner*—Deborah L. Kyle

[57]   ABSTRACT

Rare earth elements with partially filled 4f electron shells are used to form a class of absorption type band pass optical filters. The rare earth elements are advantageously incorporated in glass at concentrations with the rare earth atoms constituting upwards of 15% of all the metallic atoms. Filters with pass bands less than 5% of the center wavelength are realized.

12 Claims, 11 Drawing Figures

OPTICAL FILTERS

This is a continuation, of application Ser. No. 515,426, filed 16 Oct., 1974 now abandoned.

BACKGROUND OF THE INVENTION

This invention relates to optical filters.

Optical band pass filters have generally been of the interference type in which a succession of layers of materials are deposited on a substrate. Such filters function as band pass filters because constructive interference occurs between reflections for a certain narrow range of wavelengths permitting transmission of these wavelengths, while for other wavelengths interference is not constructive and little or no light is transmitted. Interference filters can for all practical purposes be made to transmit any desired wavelength with as narrow a pass band as is desired by properly selecting the thickness and the number of layers deposited. They are effective, however, only when used to filter well columnated light since the favorable interference condition is influenced by the angle of incidence. A further drawback is that the band pass is subject to considerable variability due to thermal expansion.

Absorption type filters which function by atomic or molecular absorption throughout the bulk of the filter material are not subject to much dependence on the angle of incidence, but they cannot be arbitrarily designed to operate at any wavelength and they have not generally provided narrow pass bands.

SUMMARY OF THE INVENTION

It has been realized according to the invention that those atoms of the rare earth group that have partially filled $4f$ electron shells (namely from cerium, atomic number 58, to ytterbium, atomic number 70) may be used to form a large class of band pass optical filters with advantageous properties. Atoms with partially filled $4f$ electron shells undergo resonant transitions in which radiations is absorbed while the $4f$ electrons are rearranged into a configuration with higher energy. It should be emphasized that in the transitions of the type considered, the final state has the same number of $4f$ electrons as the initial state and only a rearrangement within the $4f$ shell is involved. Since there are 14 states of $4f$ electrons, and each can be occupied by only one electron, the number of rearrangements possible, and the related number of possible absorption resonances, depends on the number of $4f$ electrons in the shell. For cerium with 1 $4f$ electron, and ytterbium lacking 1 of having a full shell, only one significant rearrangement is possible. Accordingly, each of these atoms exhibits only one absorption resonance. The atoms with multiple electrons and multiple vacancies have many absorption resonances. It may be noted that two elements usually classed as rare earths, namely lanthanum, with an empty $4f$ shell and lutetium with a filled $4f$ shell, are incapable of the rearrangement transitions with which this invention is concerned. It may also be noted that the rearrangement transitions are weak compared to the usual absorption resonances in atoms, and this is especially true for europium, gadolinium and terbium, which have $4f$ shells half or nearly half filled.

Band pass filters are, according to the invention, realized by incorporating triply charged ions of rare earth atoms with partially filled $4f$ shells as constituents in a solid material which may advantageously be a glass. So incorporated, the rare earth atoms have their unfilled $4f$ shells of electrons surrounded by filled $5s$ and $5p$ electron subshells. The outer $5s$ and $5p$ electrons shield deeply buried $4f$ electrons from the variable effects of adjacent atoms that perturb the energy levels of the outer electrons of an atom or ion incorporated in a solid. The result is that absorption resonances involving only rearrangements of $4f$ electrons occur at almost exactly the same position in the spectrum for every atom so that the bulk absorption resonance of the rare earth-containing material is very sharp. The rearrangement resonances may be five to ten times as sharp as resonances involving outer shell electrons which are exposed to the perturbations of neighboring atoms. On the wings of these sharp resonances the absorption coefficient changes very rapidly with changing wavelength.

Accordingly, if a sufficient quantity of rare earth atoms are disposed in an optical path through a filter to make the filter opaque at wavelengths near the center of a rearrangement resonance, there will be a very abrupt change from opaque to transparent at wavelengths in the wings of the resonance. If the filter is similarly opaque at a second absorption resonance (which may be due to the same or a different species of rare earth atoms) at say a shorter wavelength, the short wavelength wing of the first resonance will define a long wavelength boundary, and the long wavelength wing of the second resonance will define a short wavelength boundary of a pass band. Because of the abrupt transitions in the wings of $4f$ rearrangement absorptions, the boundaries of the pass band will be sharply defined and there will be a region of high transmission between the boundaries even when the pass band is very narrow. A suitable criterion for sharpness, which is applicable at various wavelengths, is the ratio of the change in transmission to the relative change in wavelength, which may be expressed as $\lambda(dT/d\lambda)$. Band pass filters employing rare earth elements with partially filled $4f$ shells according to the invention typically may have pass band boundaries with a sharpness criterion in excess of 30 and in some cases over 100. Similarly a suitable criterion for band width applicable at various wavelengths is the relative change of wavelength between the half maximum transmission points. Band pass filters according to the invention may typically have pass bands less than 5% and in some caes as less than 2% and transmissions in the band of at least 0.2.

As mentioned above, the rearrangement absorptions of the $4f$ electrons are characteristically weak in comparison to the absorptions conventionally used in absorption filter components. A correspondingly greater number of the rare earth atoms must therefore be disposed in the optical path through the filter to make the filter opaque in the spectral region of the absorption. Another aspect of the invention is accordingly to employ as an absorption component in a filter a glass containing rare earth atoms with partially filled $4f$ shells at high concentrations, and in particular in concentrations where the rare earth atoms constitute at least 15% of the metallic (i.e. non-oxygen) atoms to realize conveniently thin filter components.

In many cases the rare earth atoms which form the sharp boundaries of the pass band, although opaque immediately adjacent to the pass band, will not be absorptive at spectral regions remote from the pass band. According to another aspect of the invention, these remote regions may be advantageously blocked by additional filter components. The blocking components will be transparent in the region of the pass band and opaque in the region of the spectrum remote from the pass band where the rare earth components are transparent but may have a gradual transition from transparent to opaque over the spectral interval blocked by the rare earth material. Because a gradual transition from transparent to opaque is acceptable in the blocking components, rare earth containing materials need not be used for the blocking components. It may be advantageous to employ different blocking components for the long and short wavelength sides of the pass band.

It is readily seen from the foregoing discussion that any of a class of band pass filters may be made according to the invention by employing various pairs of rearrangement resonances of the several rare earth elements with partially filled $4f$ electron shells.

DESCRIPTION OF PREFERRED EMBODIMENTS

Figure 1:
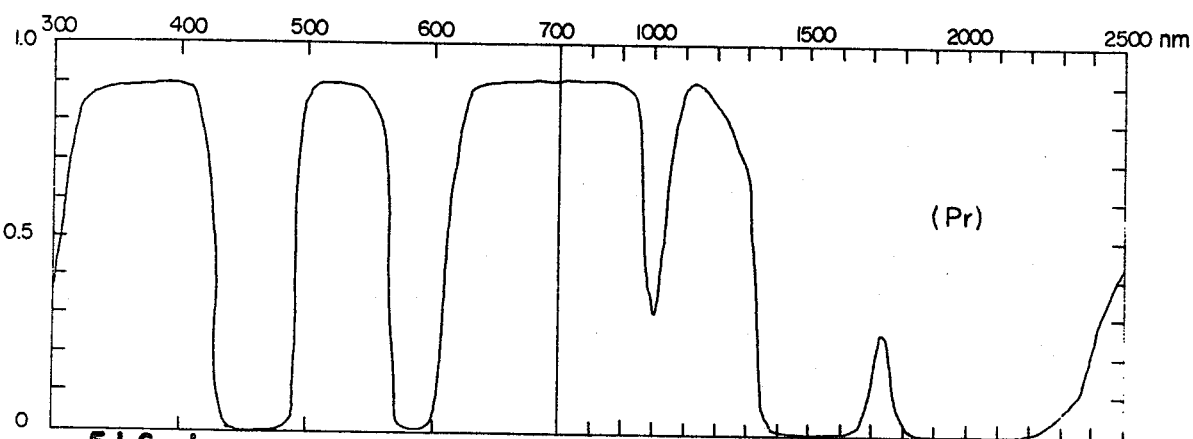
FIG. 1 shows the transmission spectrum of a glass 14mm. thick containing 20 weight percent $Pr_2O_3$.
Figure 2:
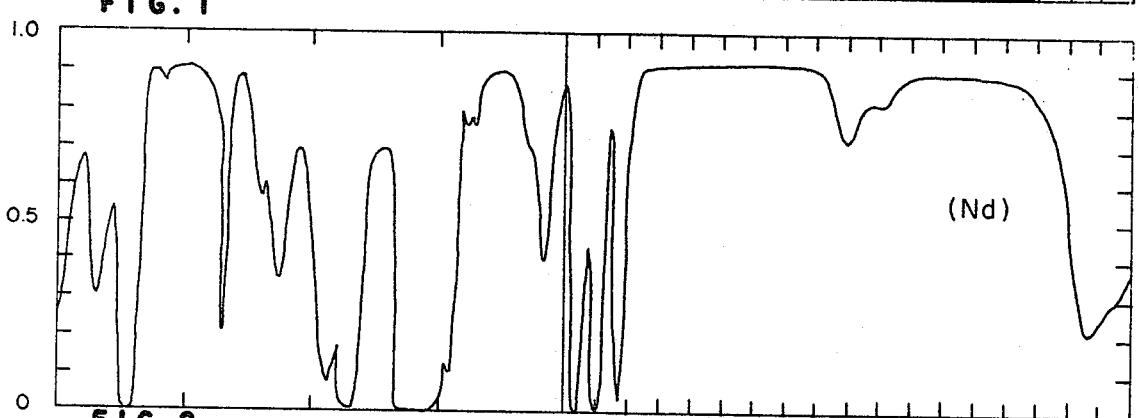
FIG. 2 shows the transmission spectrum of a glass 5mm. thick containing 20 weight percent $Nd_2O_3$.
Figure 3:
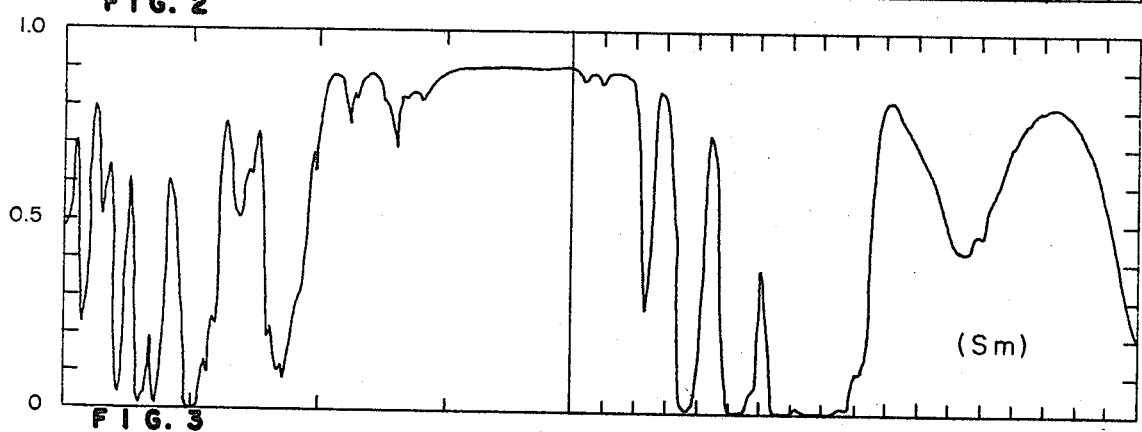
FIG. 3 shows the transmission spectrum of a glass 9mm. thick containing 20 weight percent $Sm_2O_3$.
Figure 4:
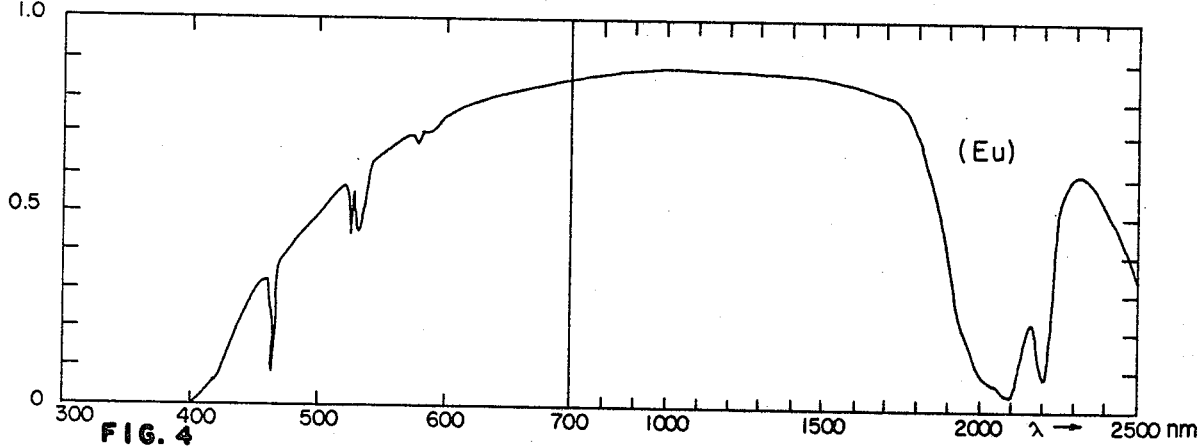
FIG. 4 shows the transmission spectrum of a glass 6mm. thick containing 20 weight percent $Eu_2O_3$.
Figure 5:
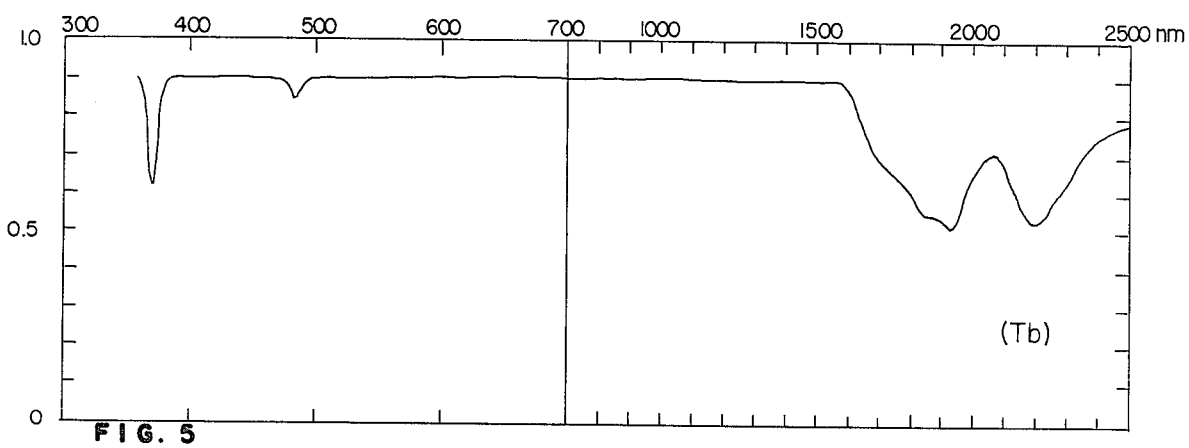
FIG. 5 shows the transmission spectrum of a glass 5mm. thick containing 12 weight percent $Tb_2O_3$.
Figure 6:
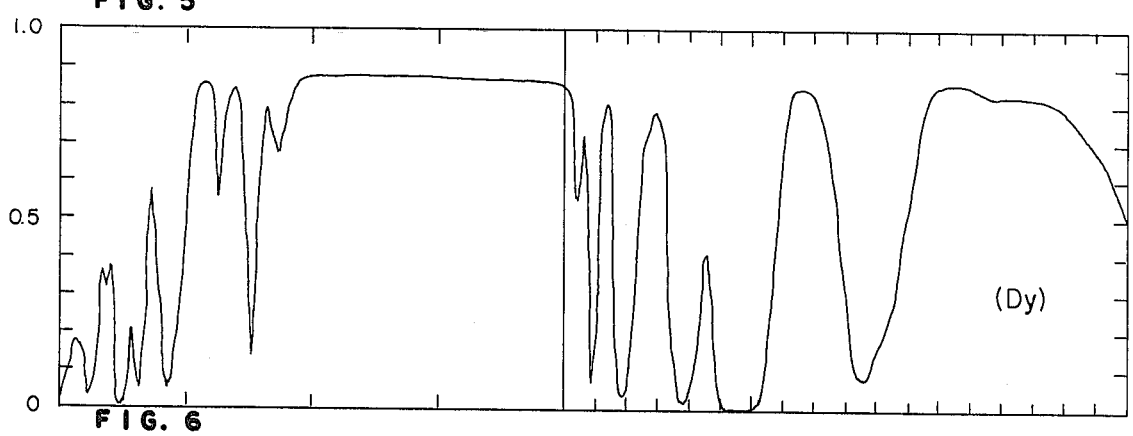
FIG. 6 shows the transmission spectrum of a glass 6mm. thick containing 20 weight percent $Dy_2O_3$.
Figure 7:
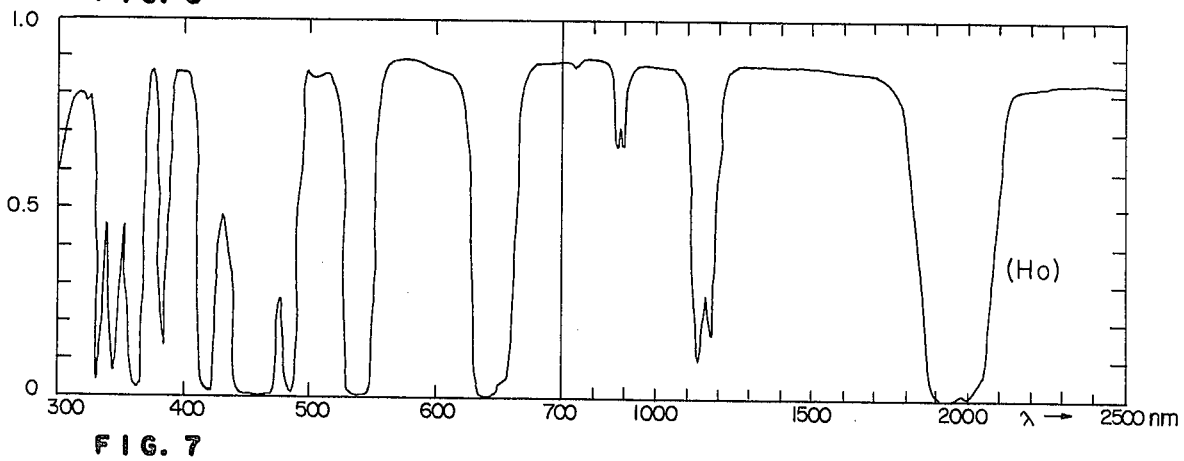
FIG. 7 shows the transmission spectrum of a glass 11mm. thick containing 20 weight percent $Ho_2O_3$.
Figure 8:
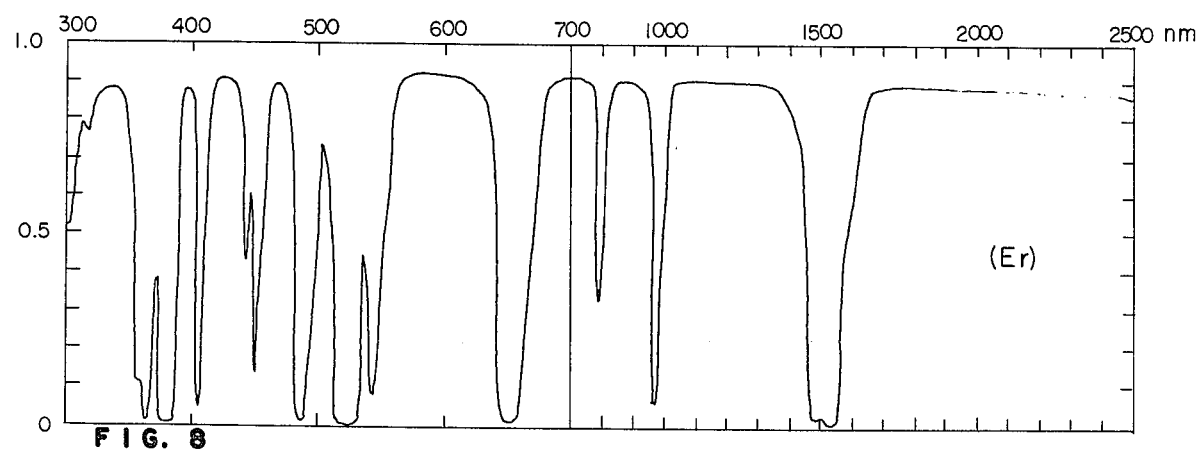
FIG. 8 shows the transmission spectrum of a glass 9mm. thick containing 20 weight percent $Er_2O_3$.
Figure 9:
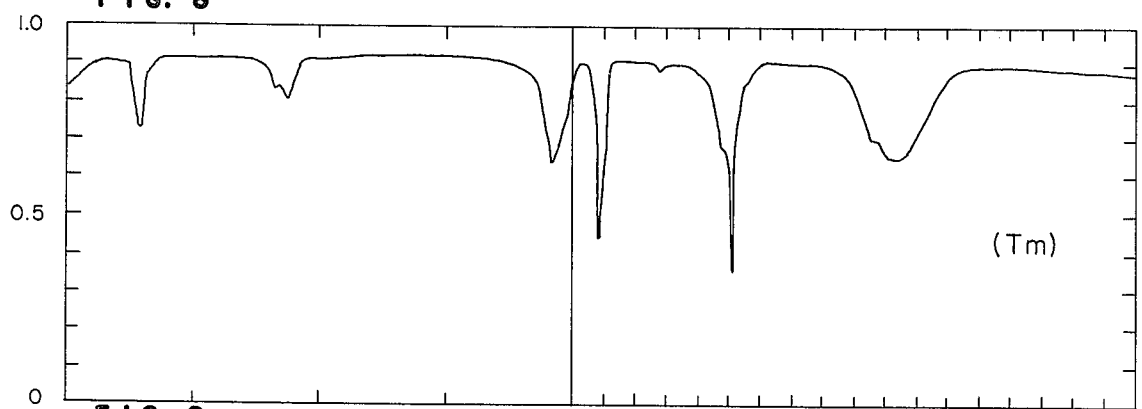
FIG. 9 shows the transmission spectrum of a glass 5mm. thick containing 3 weight percent $Tm_2O_3$.

As mentioned above, there are 13 rare earth elements with partially filled $4f$ shells, which are available for making filters according to the invention. The absorption spectra of 10 of these are shown if FIGS. 1–10. Of the remaining 3 members of the class, prometheum (atomic number 61) is radioactive and rare; cerium (atomic number 58) has a single absorption resonance in the infrared at about 4500 nm; and gadolinium (atomic number 64) has all its resonances in the ultraviolet. The transmission spectrum of europium (FIG. 4) is incomplete due to a gradual reduction of transmission as the wavelength shifts from 700 to 400 nm., which is due to a certain amount of europium in a reduced state in the glass used to make the transmission spectrum. The reduced europium has an absorption not of the $4f$ rearrangement type which is responsible for the gradual change in transmission as shown. The contrast between the strong absorption, depressing the transmission over a broad region of the spectrum, and the very sharp, rather weak rearrangement absorptions superimposed thereon is vividly shown in FIG. 4. Additional information on the absorption spectra of cerium, promethium, and gadolinium and on all elements at wavelengths outside the range show in FIGS. 1–10 is available in the technical literature dealing with atomic structure and energy levels.

Figure 10:
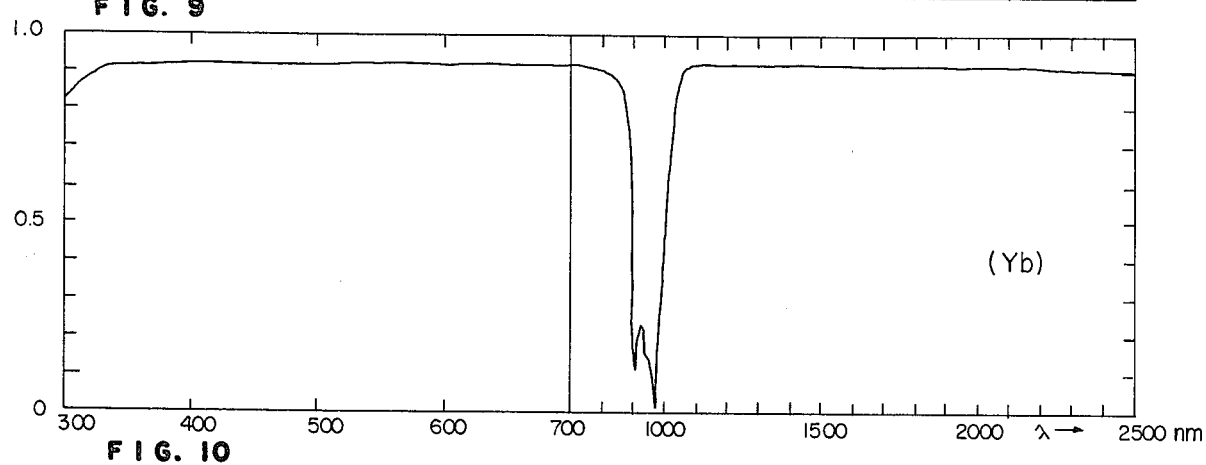
FIG. 10 shows the transmission spectrum of a glass 5mm. thick containing 16 weight percent $Yb_2O_3$.
Figure 11:
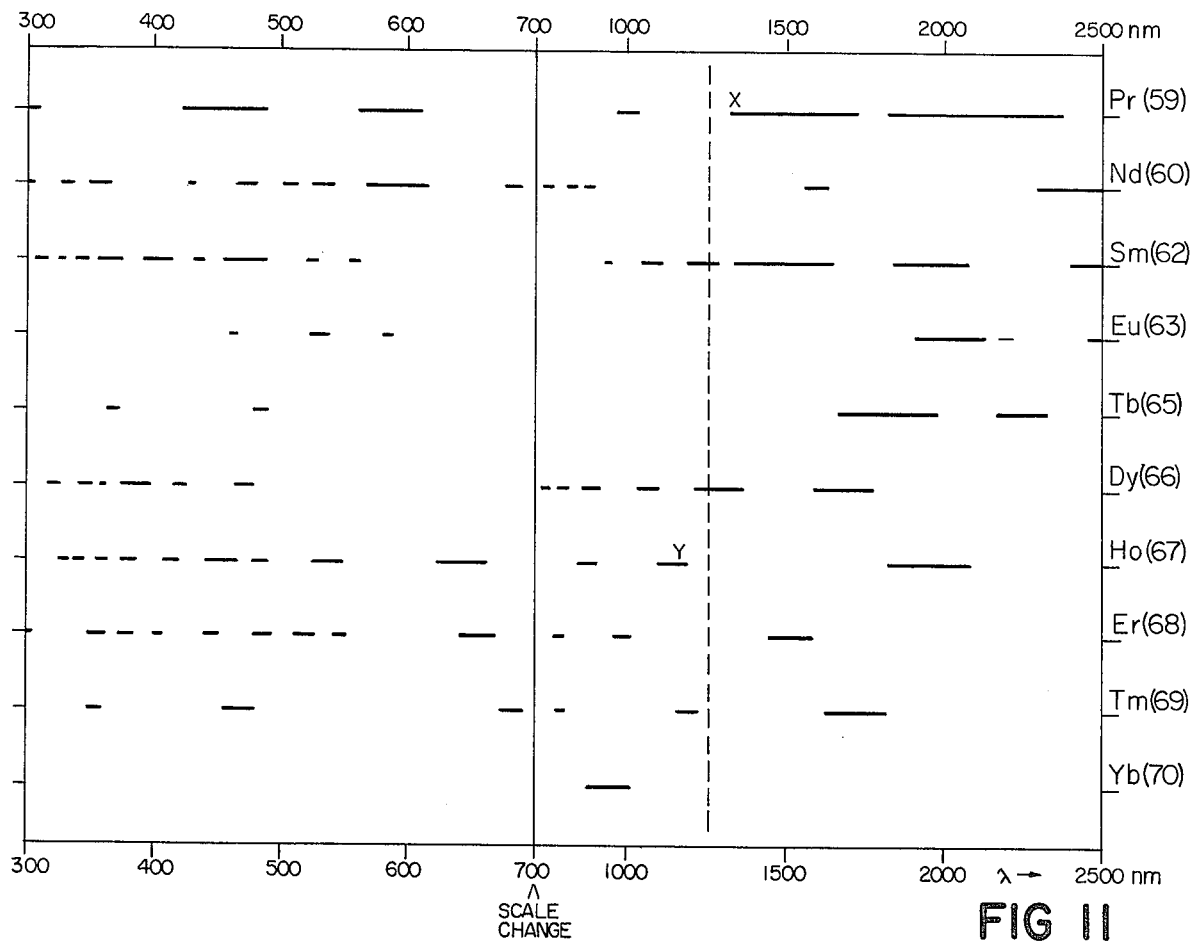
FIG. 11 shows a summary of the spectra of FIGS. 1–10 in a form convenient for designing filters according to the invention.

An examination of the spectra of FIGS. 1–10 shows that there is a wide range of choice in selecting rearrangement resonances for making filters according to the invention. FIG. 11 summarizes the data from FIG. 10 showing the absorption regions of the spectrum as bars while the transmissive regions are spaces. In particular, the left end of each bar identifies a short wavelength wing of a resonance while the right end of each bar identifies a long wavelength wing. The use of FIG. 11 to design filters according to the invention is illustrated in the following.

Consider making a filter with a pass band in the infrared at about 1250 nm. A dashed vertical line has been sketched in to identify this wavelength on the figure. Examination of the various resonances shows that praseodymium has a resonance with a short wavelength wing at about 1350 nm. (marked x), and holmium has a resonance with a long wavelength wing at about 1200 nm. (marked y). These resonances thus make a suitable pair for defining the pass band. The filter accordingly includes a praseodymium-containing glass and a holmium-containing glass. The rare earths may be compounded in a wide variety of glass compositions but an advantageous composition for the glasses is (by weight) $SiO_2$ : 11.69%; $B_2O_3$ : 11.69%; $Al_2O_3$ : 1.57% MgO : 1.57%; BaO : 17.18%; $ZrO_2$ : 1.57%; $La_2O_3$ : 9.69%; $As_2O_3$; 0.79%; $CeO_2$ : 0.25%; and rare earth oxide $R_2O_3$ : 44%. In the first glass R will be Pr and in the second Ho. It may be noted that in this glass composition the rare earth atoms constitute somewhat over 20% of the total metallic (i.e. nonoxide) atoms thus providing the requisite quantity of rare earth in compact filter components. An estimate of the required thickness of the praseodymium glass may be obtained by reference to FIG. 1 showing that the absorption above 1300 nm. is strongly saturated in 14 mm. of 20% glass. The absorption is related to the product of concentration and thickness in a well known relationship. Therefore less praseodymium is required on the optical path and using a 44% glass a 3mm. thickness will introduce sufficient absorber to make the filter opaque to the long wavelength side of 1350 nm. Similarly, referring to FIG. 7, the holmium absorption is not saturated for an optical path of 11 mm. through 20% glass. More holmium is therefore indicated than is shown in the test data of FIG. 7. For the 44% Ho glass a thickness of about 8 mm. is indicated.

A blocking component consisting of a 0.7 mm. thick piece of silicon is included in the filter to block transmission at wavelengths shorter than about 1150 nm. and make the filter opaque in portions of the spectrum in the visible and ultraviolet where both praseodymium and holmium are transmissive. The complete filter thus includes three components: a 2.3 mm. thick piece of praseodymium-containing glass, an 8 mm. thick piece of holmium containing glass, and a 0.7 mm. thick blocking component of silicon. (Alternatingly the two rare earths could be compounded in a single glass of the same general composition dividing the rare earth portion appropriately between praseodymium and holmium). This filter has a pass band extending from 1210 to 1320 nm. with a peak transmission over 50%. The rate of change of transmission with respect to relative wavelength change is about 40 at the holmium boundary and somewhat less for the praseodymium boundary.

As a second example of an infrared filter, a filter with a pass band at 1420 nm. includes 2.3 mm. of dysprosium glass defining the short wavelength boundary of the band, 4.5 mm. of erbium glass defining the long wavelength boundary and 0.7 mm. of silicon, blocking transmission throughout the spectrum in the visible and ultraviolet. The rare earth glass are advantageously compounded to the same general formula as given in connection with the previous example. This filter has a pass band extending from about 1390 nm. to 1450 nm. with a peak transmission in excess of 40%. The steepness in the erbium boundary is about 30 and in the dysprosium boundary about 15. The two infrared filters described above are useful in measuring the water content of various products.

As an example of a filter in the near ultraviolet, a filter with a pass band at 374 nm. includes 5.5 mm. of holmium glass of the composition previously described. In this case, the absorption resonance defining the short wavelength boundary and a second resonance defining the long wavelength boundary are both provided by holmium. A 6.7 mm. piece of commercially available colored filter glass (Corning Glass Works, Corning, N.Y. type 7-60) is included in the filter to block portions of the spectrum in the visible region where holmium is transmissive and a 3 mm. piece of silicate glass containing 3% $CeO_2$ is included to block radiation at ultraviolet wavelength where holmium is transmissive. (It should be noted that the absorption by cerium in this part of the spectrum is not due to a $4f$ rearrangement but involves outer electrons.) This filter has a pass band extending from about 369 nm. to 380 nm. with a peak transmission in excess of 10% and boundary steepness of about 30 on the short wave side, somewhat less on the long wavelength side.

Another ultraviolet filter may be constructed by adding to the filter just described an element of erbium glass (composition as previously described) 2.0 mm. thick. In this filter the holmium defines the short wavelength boundary of the pass band while erbium defines the long wavelength boundary, the blocking components functioning as before. The pass band of this filter extends from 368 nm. to 374 nm. with peak transmission over 10%. This filter has a pass band of only 1.6% of its center wavelength and illustrates the extremely narrow pass bands attainable using the $4f$ rearrangement resonances according to the invention.

The two ultraviolet filters described above are useful in connection with measurement of sulfur in a flame photometer. The first (holmium alone) isolates a spectral region including a sulfur radiation band excited in a flame. The second filter (holmium plus erbium) defines a smaller spectral region free of sulfur radiation. It is therefore possible using these two filters to obtain independent measurements of the sulfur emission and the flame background radiation.

A further example employs 2.0 mm. of a glass of the general composition as previously described with the rare earth component apportioned $Er_2O_3$ : 14.0%; $Sm_2O_3$ : 11.0%; $Pr_2O_3$ : 19.0%. In this glass an erbium absorption defines the short wavelength boundary and samarium defines the long wavelength boundary of the pass band. The praseodymium functions to block a spectral region around 430 to 490 nm. Additional blocking components in the filter are 3.0 mm. of the cerium glass previously described blocking in the ultraviolet and 7 mm. of a commercially available ultraviolet colored glass (Corning Glass Works, Corning, N.Y. type 7-51).

This filter illustrates the compounding of a plurality of rare earth species in a single glass filter component. The filter has a pass band extending from 387 nm. to 397 nm. and is useful in isolating a region of the spectrum containing a sulfur emmission.

From the foregoing discussion and examples the many additional members of the class of filters according to the invention will be evident to those skilled in the art and are within the following claims.

I claim:

1. An optical filter comprising a rare earth-containing material positioned across an optical path through said filter, said material containing tripley charged ions of rare earth atoms with partially filled shells of $4f$ electrons, said rare earth atoms having first and second absorption resonances arising from absorption of light with rearrangement of electrons in the $4f$ shell, said rare earth atoms being disposed in said optical path in sufficient number to make said filter opaque near center wavelengths of each of said resonances, absorption in the short wavelength wing of said first resonance defining a long wavelength boundary of a spectral band and absorption in the long wavelength wing of said second resonance defining a short wavelength boundary of said pass band, said filter including a blocking component transmissive in said spectral pass band and immediately to the long and short wave sides thereof while blocking light transmission through said filter in spectral regions remote from said pass band where said rare earth material is transmissive, said filter transmitting light throughout said band while blocking it elsewhere in the spectrum.

2. An optical filter as claimed in claim 1 with an abruptly changing transmission at the boundaries of said pass band, the ratio of change in transmission to relative change in wavelength ($\lambda(aT/a\lambda)$ in said bundaries being at least 30.

3. A filter as claimed in claim 1, wherein said first and second resonances are derived from different species of rare earth atoms.

4. A filter as claimed in claim 1, the pass band at half peak transmission being at most 5% of the band center wavelength.

5. A filter as claimed in claim 4, transmission in said band being at least 0.2.

6. A filter as claimed in claim 1, said rare earth material being glass, said rare earth atoms being incorporated as a constituent therein.

7. A filter as claimed in claim 6, the rare earth atoms in said glass comprising at least 15 percent of all the metallic atoms.

8. A filter as claimed in claim 6, wherein said glass contains holmium and praseodymium, holmium absorption defining the short wavelength bound of said interval and praseodymium absorption defining the long wavelength bound of said interval, said filter transmitting radiation in an interval including a wavelength of 1250 nm.

9. A filter as claimed in claim 6, wherein said glass contains dysprosium and erbium, dysprosium absorption defining the short wavelength bound of said pass band and erbium absorption defining the long wavelength bound of said pass band, said pass band in said filter transmitting radiation including a wavelength of 1420 nm.

10. A filter as claimed in claim 6, wherein said glass contains erbium and samarium, erbium absorption defining the short wavelength bound of said interval and samarium absorption defining the long wavelength bound of said interval, said filter transmitting radiation in an interval including a wavelength of 394 nm.

11. A filter as claimed in claim 6, wherein said glass contains erbium, erbium absorption defining both the long and the short wavelength boundaries of said pass band, said filter transmitting radiation in a pass band including a wavelength of 370 nm. while blocking radiation at 364 nm. and 374 nm.

12. A filter as claimed in claim 6, wherein said glass contains holmium, holmium absorption defining both the long and short wavelength bounds of said interval, said filter transmitting radiation in a passband including a wavelength of 374 nm.

* * * * *